(12) United States Patent
Engler et al.

(10) Patent No.: US 10,774,751 B2
(45) Date of Patent: Sep. 15, 2020

(54) PARTIAL-LOAD OPERATION OF A GAS TURBINE WITH AN ADJUSTABLE BYPASS FLOW CHANNEL

(71) Applicant: Siemens Aktiengesellschaft, Munich (DE)

(72) Inventors: Thorsten Engler, Moers (DE); Manuel Gutermuth, Essen (DE); Thomas Kerstiens, Munster (DE); Matthias Kleinenhammann, Essen (DE); Norbert Knüwer, Herten (DE); Kai Süselbeck, Dinslaken (DE); Marc Tertilt, Hattingen (DE); Ulrich Wagner, Engelskirchen (DE); Frank Weidner, Mulheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 522 days.

(21) Appl. No.: 15/030,931

(22) PCT Filed: Oct. 23, 2014

(86) PCT No.: PCT/EP2014/072703
§ 371 (c)(1),
(2) Date: Apr. 21, 2016

(87) PCT Pub. No.: WO2015/062948
PCT Pub. Date: May 7, 2015

(65) Prior Publication Data
US 2016/0273457 A1 Sep. 22, 2016

(30) Foreign Application Priority Data
Oct. 30, 2013 (EP) .................................. 13190849

(51) Int. Cl.
*F02C 9/18* (2006.01)
*F23R 3/26* (2006.01)
(Continued)

(52) U.S. Cl.
CPC .................. *F02C 9/18* (2013.01); *F02C 9/52* (2013.01); *F23R 3/26* (2013.01); *F02C 7/042* (2013.01);
(Continued)

(58) Field of Classification Search
CPC ...... F02C 9/18; F02C 9/52; F02C 3/13; F23R 3/02; F23R 3/04; F23R 3/26; F23R 3/16;
(Continued)

(56) References Cited

U.S. PATENT DOCUMENTS

| 4,168,348 A | * | 9/1979 | Bhangu .................. F23M 5/085 416/90 R |
| 5,351,474 A | | 10/1994 | Slocum et al. |

(Continued)

FOREIGN PATENT DOCUMENTS

| CN | 1076014 A | 9/1993 |
| CN | 1840864 A | 10/2006 |

(Continued)

OTHER PUBLICATIONS

International Civil Aviation Organization, Airport Air Quality Manual, 2011, ICAO, Doc 9889, First Edition, p. 3-A1-3 (Year: 2011).*
(Continued)

*Primary Examiner* — Andrew H Nguyen
*Assistant Examiner* — Stephanie Cheng
(74) *Attorney, Agent, or Firm* — Wolter Vandyke Davis, PLLC (57) ABSTRACT

A gas turbine has a compressor providing compressed air, a combustion chamber provided with a burner, and an expansion turbine, wherein a bypass flow channel is also provided (Continued)

designed to supply compressed air past the burner and to supply a hot gas flow generated in the combustion chamber during operation of the gas turbine. The opening cross section of the bypass flow channel can be adjusted, and an adjustment unit is designed to adjust the opening cross section of the bypass flow channel such that the modification speed of the opening cross section is selected such that the relative combustion chamber pressure drop or a material temperature of the combustion chamber is substantially constant, in particular that the relative combustion chamber pressure drop or the material temperature of the combustion chamber does not vary by more than 10%.

12 Claims, 7 Drawing Sheets (51) Int. Cl.
  *F02C 9/52* (2006.01)
  *F02C 7/18* (2006.01)
  *F02C 7/042* (2006.01)
  *F23R 3/04* (2006.01)

(52) U.S. Cl.
  CPC ............ *F02C 7/18* (2013.01); *F05D 2270/08* (2013.01); *F05D 2270/112* (2013.01); *F05D 2270/303* (2013.01); *F23R 3/04* (2013.01); *F23R 2900/03043* (2013.01); *F23R 2900/03342* (2013.01)

(58) Field of Classification Search
  CPC .. F23R 2900/03043; F23R 2900/03045; F23R 2900/03044; F23N 2037/16; F23N 2037/20; F23N 2041/20; F05D 2270/301; F05D 2270/3011; F05D 2270/3012; F05D 2270/3013; F05D 2270/3015; F05D 2270/303; F05D 2270/3032; F05D 2270/112; F05D 2270/091; F05D 2270/08; F05D 2260/606
  See application file for complete search history.

(56) References Cited

U.S. PATENT DOCUMENTS

| | | | | |
|---|---|---|---|---|
| 5,537,864 A | | 7/1996 | Sood | |
| 5,692,370 A | * | 12/1997 | Stuhlmuller | F01D 21/00 60/39.23 |
| 6,070,406 A | * | 6/2000 | Lenertz | F02C 9/18 60/39.23 |
| 8,355,854 B2 | * | 1/2013 | Childers | F02C 6/08 60/784 |
| 8,434,313 B2 | * | 5/2013 | Tschuor | F23R 3/002 60/757 |
| 9,376,961 B2 | * | 6/2016 | Stoia | F02C 6/08 |
| 2006/0182623 A1 | | 8/2006 | Touyeras | |
| 2010/0175387 A1 | * | 7/2010 | Foust | F01D 9/023 60/782 |
| 2014/0013765 A1 | * | 1/2014 | Studerus | F02C 3/00 60/779 |
| 2015/0330301 A1 | * | 11/2015 | Cedoz | F02C 3/13 60/791 |

FOREIGN PATENT DOCUMENTS

| | | | |
|---|---|---|---|
| DE | 4339724 C1 | 1/1995 | |
| DE | 102011007059 A1 | 10/2012 | |
| EP | 1462633 A1 | 9/2004 | |
| EP | 1770331 A1 | 4/2007 | |
| EP | 1770331 A2 | 4/2007 | |
| GB | 775365 A * | 5/1957 | F23R 3/26 |
| RU | 2310086 C1 | 11/2007 | |
| WO | 9823902 A1 | 6/1998 | |

OTHER PUBLICATIONS

RU Notice of Allowance dated Jun. 13, 2017, for RU patent application No. 2016112464.
CN Office Action dated Dec. 2, 2016, for CN patent application No. 201480060031.4.

* cited by examiner

FIG 6

PARTIAL-LOAD OPERATION OF A GAS TURBINE WITH AN ADJUSTABLE BYPASS FLOW CHANNEL

CROSS REFERENCE TO RELATED APPLICATIONS

This application is the US National Stage of International Application No. PCT/EP2014/072703 filed Oct. 23, 2014, and claims the benefit thereof. The International Application claims the benefit of European Application No. EP13190849 filed Oct. 30, 2013. All of the applications are incorporated by reference herein in their entirety.

FIELD OF INVENTION

The present invention relates to a method for operating at partial load a gas turbine which comprises a compressor for providing compressor air, a combustion chamber provided with a burner, and an expansion turbine, a bypass flow channel furthermore being provided, which is configured in order to deliver compressor air past the burner and to a hot gas flow generated in the combustion chamber during gas turbine operation. The present invention also relates to such a gas turbine.

BACKGROUND OF INVENTION

Gas turbines can typically be operated only in a restricted way in their power range toward the lower partial load ranges because of limit value requirements for the CO emission quantities. This is because, when the partial load operation is reduced to lower powers, the primary zone temperature of the combustion typically decreases continuously. When this primary zone temperature falls below a temperature limit value typical of a gas turbine, the amount of CO emission increases, sometimes exponentially, since the combustion of CO to form $CO_2$ can no longer take place to a sufficient extent. When predetermined limit values are reached, the partial load operation must therefore be restricted to lower powers in order not to violate the CO emission limit values. Such a restriction likewise has an effect on the operation of a steam turbine system coupled to such a gas turbine (in the sense of a Combined Cycle Power Plant, CCPP), since a power reduction possibly desired by the operator is not to be reached below a limit value.

Because of compliance with predetermined CO emission limit values, a power plant operator is thus obliged to periodically turn off the gas turbine, or a steam power plant system coupled to this gas turbine, or remain in a partial load range which lies above the technically possible minimum power.

There is consequently a technical requirement to provide a gas turbine, or a method for operating such a gas turbine, making it possible to reduce the partial load range further without simultaneously exceeding CO emission limit values. In other words, the partial load range of the gas turbine is intended in particular to be extended downward while complying with CO emission limit values. Above all, this partial load range should be provided below the otherwise technically available load range which can be achieved by suitable guide vane adjustment (so-called guide vane adjustment range).

One solution approach for these technical requirements may be specified by the publications US 2010/0175387 A1 and U.S. Pat. No. 5,537,864. In these documents, it is proposed to adjust the amount of air blown out from the compressor by suitable control by means of a bypass flow channel, in such a way that the primary zone temperature does not change substantially. Since the primary zone temperature itself cannot be measured directly, however, these controls always rely on predetermined assumptions, or estimates.

At this point, it should be pointed out that the primary zone temperature (TPZ) is an average temperature determined from the energy balance around the burner and flame, which describes the thermodynamic state of the hot gas after completed chemical reaction. The TPZ therefore correlates with the proportion of CO in the combustion gases.

It is therefore desirable to provide a more highly developed method which can avoid the above-mentioned problems of the prior art, and at the same time can provide reference quantities that can be metrologically recorded better.

SUMMARY OF INVENTION

Objects of the invention are achieved by a method as claimed, as described above and below, for operating such a gas turbine, and by a gas turbine as claimed as described below.

In particular, these objects of the invention are achieved by a method for operating at partial load a gas turbine which comprises a compressor for providing compressor air, a combustion chamber provided with a burner, and an expansion turbine, a bypass flow channel furthermore being provided, which is configured in order to deliver compressor air past the burner and to a hot gas flow generated in the combustion chamber during gas turbine operation, and the opening cross section of the bypass flow channel furthermore being adjustable by a setting means, which comprises the following steps:—operating the gas turbine at partial load;—adjusting the opening cross section of the bypass flow channel so that the variation rate of the opening cross section is selected in such a way that the relative combustion chamber pressure loss or a material temperature of the combustion chamber is essentially constant, in particular that the relative combustion chamber pressure loss or the material temperature of the combustion chamber does not vary by more than 10%.

Objects of the invention are furthermore achieved by a gas turbine suitable for carrying out a method as presented above and below, which comprises a compressor for providing compressor air, a combustion chamber provided with a burner, and an expansion turbine, a bypass flow channel furthermore being provided, which is configured in order to deliver compressor air past the burner and to a hot gas flow generated in the combustion chamber during gas turbine operation, and the opening cross section of the bypass flow channel furthermore being adjustable by a setting means, which furthermore comprises an adjustment unit, which is configured in order to adjust the opening cross section of the bypass flow channel in such a way that the variation rate of the opening cross section is selected in such a way that the relative combustion chamber pressure loss or a material temperature of the combustion chamber is essentially constant, in particular that the relative combustion chamber pressure loss does not vary by more than 10%.

The adjustment unit is in this case advantageously configured as a regulating unit, although it may also be configured as a control unit. The adjustment unit in this case allows automatic adjustment of the variation rate of the opening cross section, or of the opening cross section.

It should be pointed out that the relative combustion chamber pressure loss can be determined as the ratio of the combustion chamber differential pressure and the compressor final pressure. In this case, the combustion chamber differential pressure is given by a difference of two static pressures, which are determined at different measurement positions on or in the combustion chamber. Typically, one pressure determination is determined before the burner, or in the region of the burner, and one pressure value inside the combustion chamber, for instance at the end of the combustion zone. The pressure difference of the two pressure values determined is related by taking the ratio to the compressor final pressure, which, as the name already says, describes the static pressure at the end of the compressor and can likewise be recorded metrologically.

It should likewise be pointed out that that the combustion chamber material temperature according to the invention relates to a material temperature which can be recorded metrologically directly or indirectly. Such a temperature is, in particular, a temperature of the combustion chamber wall, a temperature of the combustion chamber tiles, or for instance a temperature of a flame tube component which the combustion chamber also comprises.

The provision of a bypass flow channel as described above in a gas turbine is already known from the prior art. For example, DE 43 39 724 C1 describes a gas fitting which has a common wall between a compressor outlet and a turbine outlet. This wall has a slider which covers corresponding slots in this wall. The slots are in this case to be understood in the sense of a bypass flow channel. The slots can be adjusted variably in terms of their opening cross section by actuating the slider. According to the teaching of DE 43 39 724 C1, provision is made to adjust the slots according to the gas turbine power, so as to keep the mass flow rate in the turbine at a suitable order of magnitude. In the event of load shedding, in order to avoid automatic acceleration of the gas turbine, the slots can be moved approximately immediately into a final position, for instance by suitable actuation, so as to avoid bypassing of the burner by the compressor air. The operating mode described in DE 43 39 724 C1, however, is intended exclusively for power regulation and therefore does not allow operation which is carried out in accordance with CO emission limit values.

At this point, it should be pointed out that the disclosure of DE 43 39 724 C1 is incorporated into the present application by explicit reference.

Adjustment of the opening cross section of the bypass flow channel can now ensure that an operating mode complying with CO emission limit values can be achieved in the event of partial load operation. In this case, for instance, the opening cross section of the bypass flow channel may be varied as a function of time so that the variation rate of the opening cross section is selected in such a way that the primary zone temperature is essentially constant. Advantageously, the primary zone temperature in this case remains essentially constant below the gas turbine power range determined by the guide vane adjustment range. When the minimum guide vane adjustment range is reached, the primary zone temperature thus typically still lies above a temperature below which a significant increase in the CO emission values is to be expected. Suitable estimates of this temperature are known from the prior art.

On the basis of such thermal estimates, or suitable calculation methods, the opening cross section of the bypass flow channel can also be calculated in the event of partial load powers which lie in particular below the gas turbine power range determined by the guide vane adjustment range, in which case an essentially constant primary zone temperature may for instance be ensured as a boundary condition. Such estimates or calculation methods may sometimes also be based on test measurements. If partial load operation is now reduced to lower values, according to the invention a continuous adjustment of the opening cross section of the bypass flow channel to larger values is carried out, so that an increasing pressure equalization between the downstream region of the bypass flow channel (combustion chamber) and the upstream region of the bypass flow channel (compressor air plenum) results.

As a consequence of this, the pressure difference which determines the flow rate of the compressor air through the burner is also reduced. At the same time—varying depending on the embodiment of the gas turbine—it is also possible to modify the cooling power for the combustion chamber cooling, which results for instance because of the flow of compressor air into cooling channels of the combustion chamber for cooling hot gas parts in the combustion chamber. At this point, the gas turbine of the type SGT X-200E of the Applicant is to be mentioned in particular, in which such cooling channels are provided as cooling air bores for cooling the flame tube bottoms by impact cooling (see also, for instance, DE 43 39 724 C1).

Because of the reduction of the pressure of the compressor air flow delivered to the combustion chamber, there is also a reduction in the cooling power of the hot gas parts in the combustion chamber. If the thermal loads for the hot gas parts of the combustion chamber now become too great because of the reduced cooling, material damage and failure of individual components is to be expected. In order to anticipate such a development, it is now proposed according to the invention to carry out an adaptation of the variation rate of the opening cross section of the bypass flow channel, specifically in such a way that the relative combustion chamber pressure loss or a material temperature of the combustion chamber is used as an adjustment quantity. By an essentially constant relative combustion chamber pressure loss, the flow rate of the compressor air for cooling the hot gas parts in the combustion chamber is likewise kept essentially constant. This results in an essentially constant cooling rate, so that it is possible to avoid an increase of the temperatures to which the hot gas parts in the combustion chamber are exposed.

According to one embodiment, it is proposed to operate a gas turbine by a method for operating the gas turbine at partial load with the following steps:—operating the gas turbine (100) at partial load;—adjusting the opening cross section (Q) of the bypass flow channel (10) so that the variation rate (V) of the opening cross section (Q) is selected in such a way that the primary zone temperature (TPZ) is essentially constant, and in particular does not vary by more than 10%. This is intended in particular to be carried out in the event of a reduction of the partial load, and specifically initially until the thermal loads for the hot gas parts of the combustion chamber become too great. Subsequently, provision may be made to operate the gas turbine by a method as claimed, so that the resulting cooling power in the combustion chamber, or at the hot gas parts in the combustion chamber, is essentially constant. According to this embodiment, the primary zone temperature is thus initially used as a suitable adjustment quantity, the relative combustion chamber pressure loss or the material temperature of the combustion chamber being used as a further adjustment quantity after reaching a temperature limit value not further to be exceeded. By the combined mode of operation, or the respective individual modes of operation, it is ensured that the CO emission values can be kept essentially constant, or lie below predetermined CO limit values.

The variation rate of the opening cross section of the bypass flow channel is thus adapted in the course of the partial load operation in such a way that a reduction of the partial load below system-specific limit values (for instance determined by the guide vane adjustment range) can be made possible.

According to the invention, it is possible to carry out the variation of the opening cross section of the bypass flow channel as a continuous and/or stepwise variation over time, the respective variations being carried out in such a way that the underlying adjustment quantities (for instance relative combustion chamber pressure loss) remain essentially constant, but in particular do not vary by more than 10%. The respective variations to be carried out may, in the case of a discrete variation, be stored in the scope of interpolation points in an adjustment unit, which then if need be cause a suitable variation of the opening cross section. The variation rate of the opening cross section is in this case to be understood as a time average over the individual discrete interpolation points.

According to a first embodiment of the invention, a first method for operating the gas turbine at partial load with the following steps is carried out during a first time period:— operating the gas turbine (100) at partial load;—adjusting the opening cross section (Q) of the bypass flow channel (10) so that the variation rate (V) of the opening cross section (Q) is selected in such a way that the primary zone temperature (TPZ) is essentially constant, and in particular does not vary by more than 10%. The method as claimed is carried out during a second time period, in particular with the second time period directly following the first time period. As already explained above in detail, in this way it is possible to achieve a particularly efficient operating mode of the gas turbine at partial load, which allows CO-compliant operation even in very low partial load ranges. According to one embodiment, it is particularly advantageous for the partial load to be reduced in this case over the time periods, and in particular reduced over the two time periods.

According to another embodiment of the method according to the invention, the method for operating the gas turbine at partial load with the following steps:—operating the gas turbine (100) at partial load;—adjusting the opening cross section (Q) of the bypass flow channel (10) so that the variation rate (V) of the opening cross section (Q) is selected in such a way that the primary zone temperature (TPZ) is essentially constant, and in particular does not vary by more than 10%, is carried out during a first time period until a first thermal characteristic reaches a predetermined first limit value, in particular with this being followed by a second time period during which a method as claimed is carried out. The first thermal characteristic is in this case, in particular, a measure of the cooling power at hot gas parts of the combustion chamber. To this extent, when a thermal limit value (first limit value) is exceeded, more reliable operation of the gas turbine is achieved even with still low partial load powers than during the first time period, without exceeding CO emission limit values.

According to another method, the method as claimed is carried out with a partial load reduction until a second thermal characteristic reaches a predetermined second limit value, in particular with the variation of the opening cross section then being selected in such a way that the opening cross section is reduced, in particular reduced stepwise. Such a method-technology precaution may sometimes be necessary since the relative combustion chamber pressure loss is dependent on the ambient conditions, and a sufficient cooling power of the hot gas parts of the combustion chamber cannot therefore always be ensured, for instance when the ambient temperatures are very high. If a sufficient cooling power is not then provided despite a continuous or stepwise increase of the opening cross section of the bypass flow channel, a second limit value of a second thermal characteristic may be exceeded. The thermal characteristic is in particular a suitable adjustment quantity which records the thermal loading the combustion chamber, and therefore ensures thermally reliable operation of the gas turbine. A suitable characteristic quantity for this thermal load may, for example, be a measured material temperature (advantageously in the combustion chamber), which has been recorded directly or indirectly by means of a thermocouple, or a substitute characteristic, for example the relative combustion chamber pressure loss or another suitable thermal quantity.

If the second limit value is now reached by the second thermal characteristic, the opening cross section of the bypass flow channel is reduced. This reduction is advantageously carried out in steps of about 10% of the overall range. As a result of this, the cooling air flow rate increases again and the hot gas parts of the combustion chamber are supplied with more cooling power. According to one embodiment, this process with a stepwise variation may in particular be repeated until the second thermal characteristic reaches a value above a further third thermal limit value.

According to one refinement of the method according to this embodiment, in the event of a reduction of the opening cross section and when a third thermal predetermined limit value is reached by the second thermal characteristic, the variation of the opening cross section is selected in such a way that the opening cross section is increased again, in particular increased again stepwise. A stepwise increase may in this case advantageously be carried out in steps of about 10% of the overall range. Owing to the hysteresis thus carried out of initially a reduction and then subsequently an increase of the opening cross section of the bypass flow channel again, stable regulation of the gas turbine operation can be achieved.

According to one embodiment of the method according to the invention, the method is carried out below the guide vane adjustment range. As a result of this, as explained above, the partial load power range can be reduced further, but without the risk of exceeding CO limit values. In this way, the flexibilizaton of the gas turbine operation can be improved significantly.

According to a first embodiment of the gas turbine according to the invention, it furthermore comprises a regulating circuit and a measurement probe, the measurement probe being configured in order to record a thermal characteristic and the regulating circuit being configured in order, in the event of a partial load reduction and when a predetermined limit value (second limit value) of the thermal characteristic (second thermal characteristic) is reached, the variation of the opening cross section is selected in such a way that the opening cross section is reduced again, in particular reduced stepwise.

As already mentioned above, stable regulation of the gas turbine can be achieved in this way, and at the same time the dependency of the relative combustion chamber pressure loss on the ambient conditions can be taken into account. Likewise, protection of hot gas parts of the combustion chamber by sufficient cooling can be ensured at the same time.

According to another embodiment of the gas turbine according to the invention, the gas turbine is configured in such a way that the compressor air delivered to the burner is provided at least partially in order to cool hot gas parts of the combustion chamber, in particular flame tube bottoms, by means of feeding through cooling channels in the combustion chamber. By the provision of cooling channels in the combustion chamber, particularly when carrying out the method as claimed, a sufficient cooling power can be ensured. Overheating and consequent damage to hot parts of the combustion chamber can therefore be prevented.

The invention will be described in detail below with the aid of individual figures. In this case, technical features which have the same references have the same technical effects.

It should likewise be pointed out that the following figures are to be interpreted merely schematically, and no restriction in respect of the implementability of the invention may be based thereon.

It should likewise be pointed out that the technical features explained below are claimed in any combination with one another so long as the combination can achieve the object of the invention.

DETAILED DESCRIPTION OF INVENTION

Figure 1:
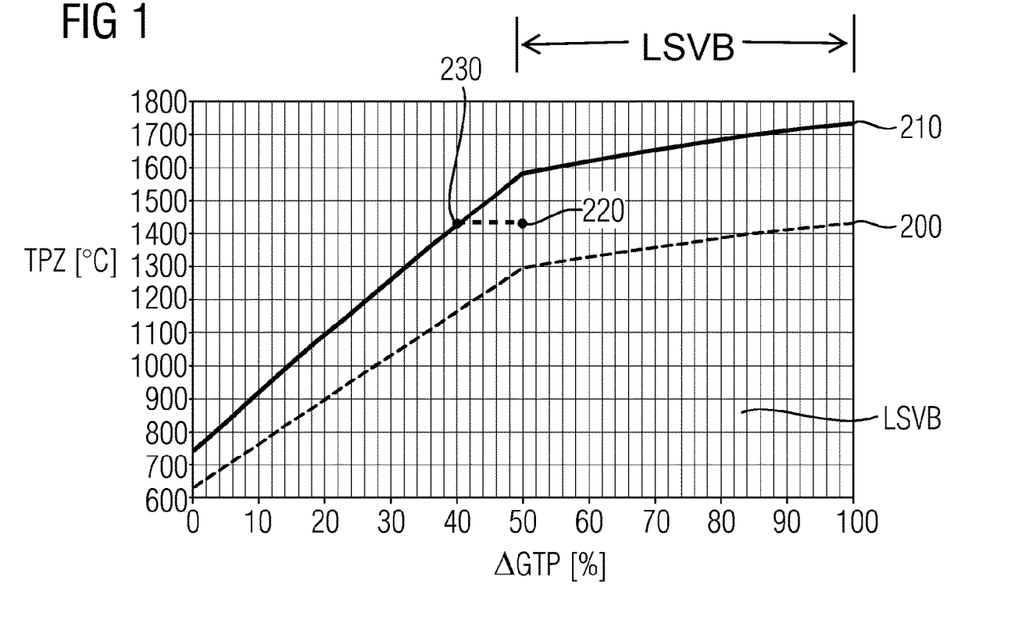
FIG. 1 shows a schematic representation of the variation of the primary zone temperature (TPZ) as a function of the relative gas turbine power (AGTP) with a fully closed and open opening cross section of the bypass flow channel.

FIG. 1 shows a diagrammatic representation of the profile of the primary zone temperature TPZ (in ° C.) as a function of the relative gas turbine power AGTP (in %). In this case, two fundamentally different modes of operation of the gas turbine are represented, namely one with a fully closed bypass flow channel (operating mode 200) and one with a fully open bypass flow channel (operating mode 210). A flatter profile in the region of the guide vane adjustment range LSVB over which the gas turbine can be operated with conventional partial load operation by suitable adjustment of the guide vanes in the guide vane adjustment range LSVB at different partial load powers, can be seen clearly for the two operating modes 200 and 210. Support of the partial load operation below this guide vane adjustment range LSVB by adjusting the guide vanes is, however, no longer possible. The ranges available to the invention preferably relate to these ranges lying below. They consequently lie between the range 200 with a closed bypass flow channel and the range 210 which represents an operating mode with an open bypass flow channel.

For example, FIG. 1 represents two points 220, 230 which are used to illustrate further operating points. The operating point 220 represents an operating state with a minimum guide vane guide vane adjustment range, which, with a partially open bypass flow channel, reaches the primary zone temperature TPZ as exists for instance with a basic load. In contrast thereto, the operating point 230 represents an operating state which likewise reaches the primary zone temperature TPZ for a basic load, but does so with a fully open bypass flow channel. The operating point 230 is, however, significantly below the technically possible minimum guide vane adjustment range LSVB in terms of the relative gas turbine power.

Figure 2:
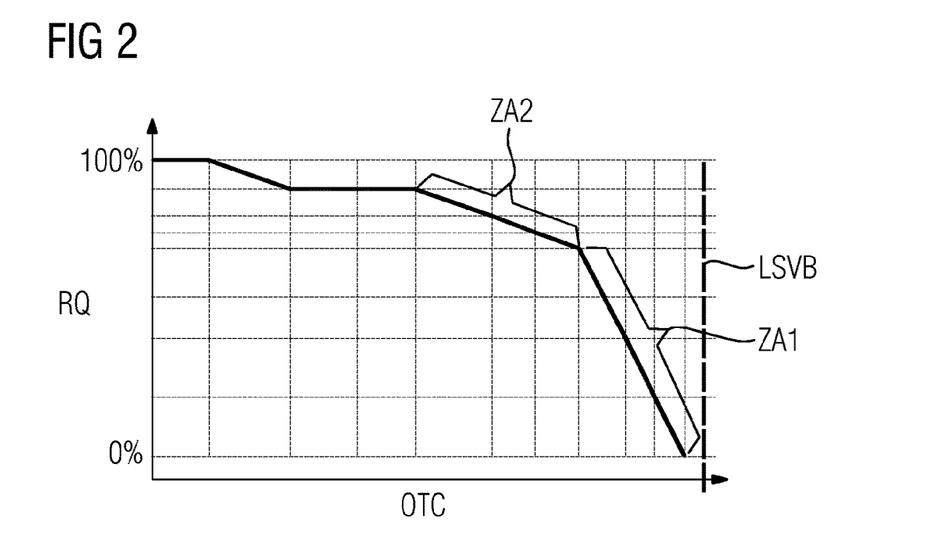
FIG. 2 shows a diagrammatic representation of the relative opening cross section (RQ) as a function of the corrected turbine output temperature (OTC) below the guide vane adjustment range (LSVB) corresponding to suitable embodiments of the operating mode according to the invention at partial load.

FIG. 2 represents the functional profile of the relative opening cross section RQ as a function of the corrected turbine output temperature OTC. The relative opening cross section RQ relates to the ratio of the existing, i.e. adjusted, opening cross section Q to the maximum possible opening cross section. In this case, the operating mode represented has, below the guide vane adjustment range LSVB, a control curve which has a plurality of interpolation points. With a decreasing corrected turbine output pressure OTC, i.e. with a decreasing partial load power, during a first time period ZA1 an operating mode is initially selected which requires the adjustment of the opening cross section Q of the bypass flow channel 10 to be carried out in such a way that the variation rate V of the opening cross section Q is selected so that the primary zone temperature TPZ is essentially constant, and in particular does not vary by more than 10%. An example of this is shown as line 240. During this first time period ZA1, an essentially constant primary zone temperature TPZ can therefore be ensured, so that the CO emission values can be kept above particular limit values not to be exceeded.

During a second time period ZA2, which directly follows the first time period ZA1, the operating mode is modified in such a way that it is now carried out according to an embodiment as claimed. In this case, for the gas turbine, the adjustment of the opening cross section Q of the bypass flow channel 10 is carried out in such a way that the variation rate V of the opening cross section Q is selected so that the relative combustion chamber pressure loss ABDV or the material temperature MT of the combustion chamber 4 is essentially constant, and in particular so that the relative combustion chamber pressure loss ABDV or the material temperature MT does not vary by more than 10%. According to this operating mode, it is possible to ensure that a sufficient cooling power for hot gas parts in the combustion chamber is still available, and thermal damage to these components can thus be prevented, while complying with the CO emission limit values.

The further interpolation points, or operating states, shown in the representation respectively relate to interpolation points, or operating states, respectively known from the prior art, and not to be explained further.

The corrected turbine output temperature OTC given in FIG. 2 corresponds to the turbine output temperature corrected in relation to the air temperature, as is explained in detail for example in EP 1 462 633 A1.

Figure 3:
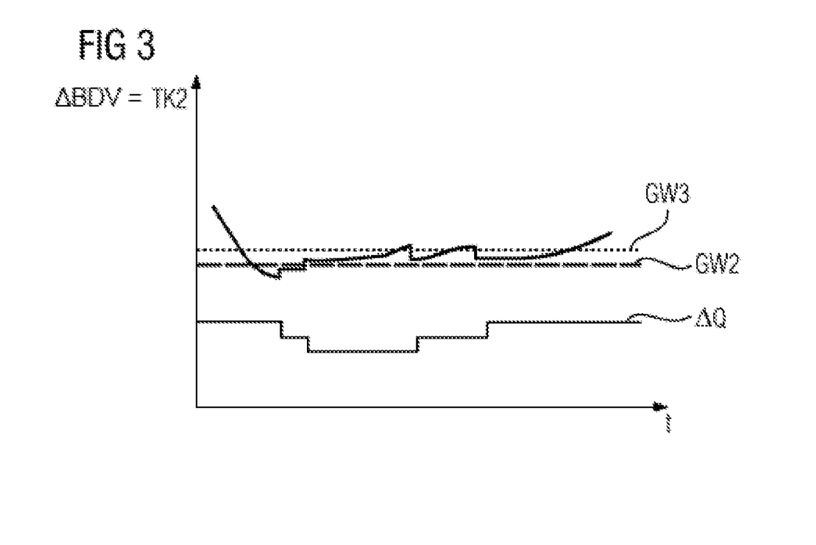
FIG. 3 shows a functional profile of a pressure characteristic as the second thermal characteristic (TK2) as a function of time (t) during operation to reduce the partial load power when reaching a second limit value (GW2) and a third limit value (GW3)

FIG. 3 shows a variation, carried out in the event of partial load reduction, of the second thermal characteristic TK2 (e.g., a pressure characteristic in this example) as a function of time. In this case, it is shown that initially at small times the partial load reduction also entails a reduction of the second thermal characteristic TK2 (e.g., the pressure characteristic). When a predetermined second limit value GW2 is exceeded, however, the variation of the cross section Q of the bypass flow channel 10 is selected in such a way that the opening cross section Q is now reduced, in particular reduced stepwise. The stepwise reduction is in this case indicated by the variation profile AQ of the opening cross section Q. Thus, a reduction of the opening cross section Q by two steps is initially carried out, so that the profile of the thermal characteristic TK2 is again raised above the second limit value GW2. After two stepwise reductions of the opening cross section Q, the profile of the second thermal characteristic TW2 reaches a third predetermined limit value GW3, which now requires the opening cross section Q to be increased again, in particular increased again stepwise. In the present case, the increase of the opening cross section Q again takes place in two steps of comparable size to the previous two steps, so that the resulting opening cross section Q corresponds to the opening cross section Q which there was before initiation of the stepwise variations. This leads to a stabilization of the strongly decreasing thermal characteristic (e.g., pressure characteristic) and therefore a stabilization of the operation of the gas turbine 100 at partial load. The variations of the opening cross section Q according to the variation profile AQ are in this case carried out by an adjustment unit 20, which instigates the corresponding adaptations.

Figure 4A:
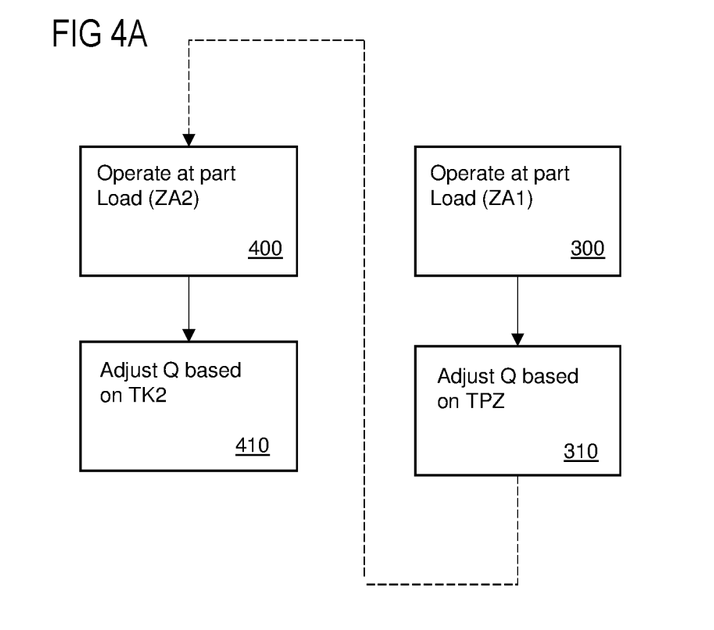
FIGS. 4A-4D illustrate embodiments of the method according to the invention as claimed in a flowchart representation.

FIG. 4A is a flowchart illustrating a first method for operating the gas turbine (100) at partial load with the following steps carried out during a first time period (ZA1): operating the gas turbine (100) at partial load [Step 300]; adjusting the opening cross section (Q) of the bypass flow channel (10) so that the variation rate (V) of the opening cross section (Q) is selected in such a way that the primary zone temperature (TPZ) is essentially constant, and in particular does not vary by more than 10% [Step 310].

The flowchart in FIG. 4A also illustrates a further method for operating at partial load a gas turbine (100) with the following steps carried out during a second time period (ZA2): operating the gas turbine (100) at partial load [Step 400]; adjusting the opening cross section (Q) of the bypass flow channel (10) so that the variation rate (V) of the opening cross section (Q) is selected in such a way that the relative combustion chamber pressure loss (ΔBDV) or a material temperature (MT) of the combustion chamber (4) is essentially constant, in particular that the relative combustion chamber pressure loss (ΔBDV) or the material temperature (MT) of the combustion chamber (4) does not vary by more than 10% [Step 410].

The flowchart in FIG. 4A also illustrates with a dotted connected line that the second time period (ZA2) directly follows the first time period (ZA1).

Figure 4B:
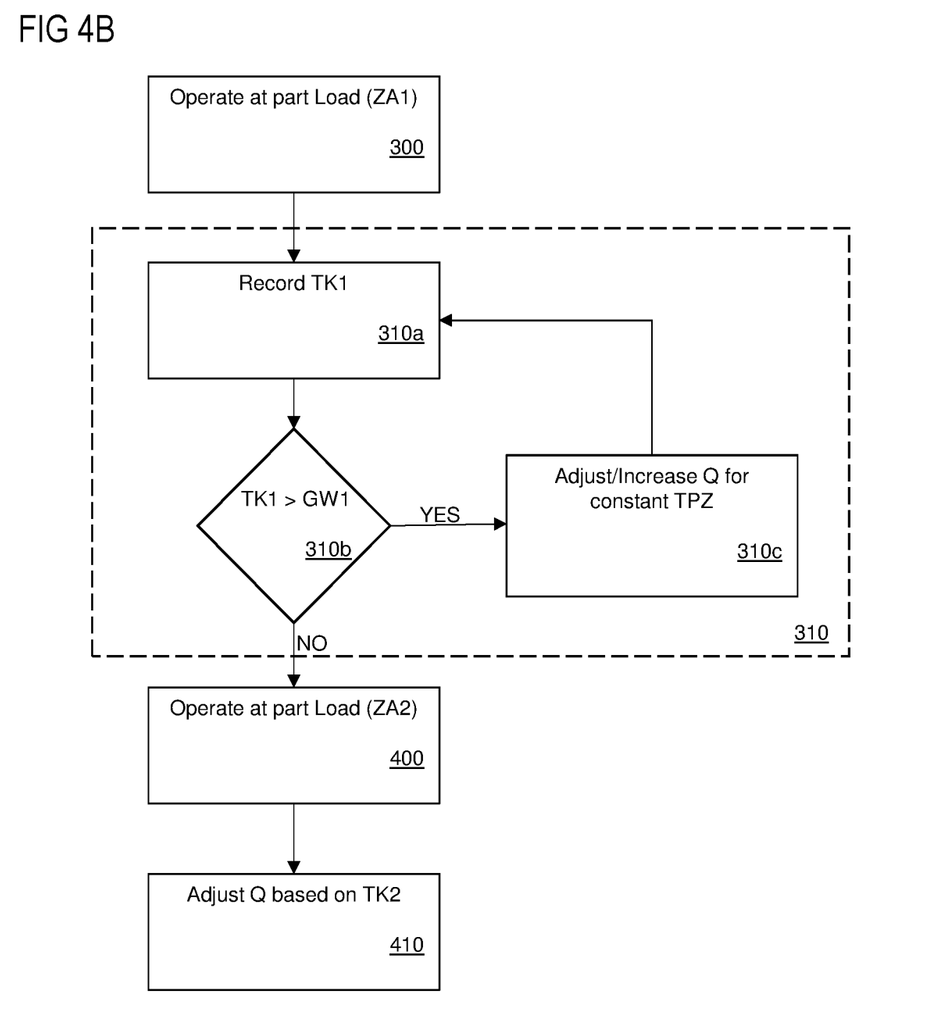

FIG. 4B illustrates further details for the first method for operating the gas turbine (100) at partial load with the following steps: operating the gas turbine (100) at partial load [Step 300]; during the first time period (ZA1) until a first thermal characteristic (TK1) [Step 310a] reaches a predetermined first limit value (GW1) [Step 310b], adjusting the opening cross section (Q) of the bypass flow channel (10) so that the variation rate (V) of the opening cross section (Q) is selected in such a way that the primary zone temperature (TPZ) is essentially constant, and in particular does not vary by more than 10% [Step 310c]. The method is carried out in particular with this being followed by a second time period (ZA2) during which the further method [Steps 400-410] is carried out.

Figure 4C:
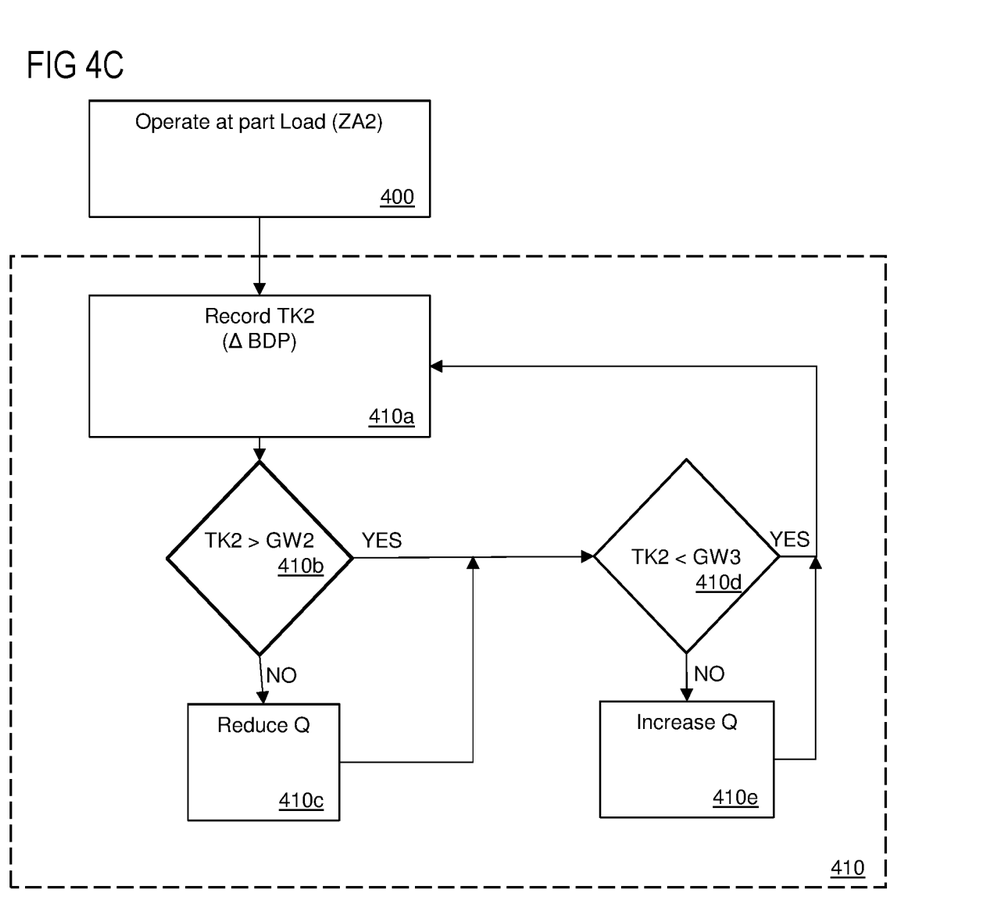

FIG. 4C illustrates further details for the further method [Steps 400-410] for operating the gas turbine (100) at partial load with the following steps: the method is carried out with a partial load reduction [Step 400] until a second thermal characteristic (TK2), in this example relative combustion chamber pressure loss (ΔBDV) as the second thermal characteristic (TK2), [Step 410a] reaches a predetermined second limit value (GW2) [410b], in particular with the variation of the opening cross section (Q) then being selected in such a way that the opening cross section (Q) is reduced [Step 410c], in particular reduced stepwise. In the event of a reduction of the opening cross section (Q) [Step 410c] and when a third predetermined limit value (GW3) is reached by the second thermal characteristic (TK2) [Step 410d], the variation of the opening cross section (Q) is selected in such a way that the opening cross section (Q) is increased again [Step 410e], in particular increased again stepwise.

Figure 4D:
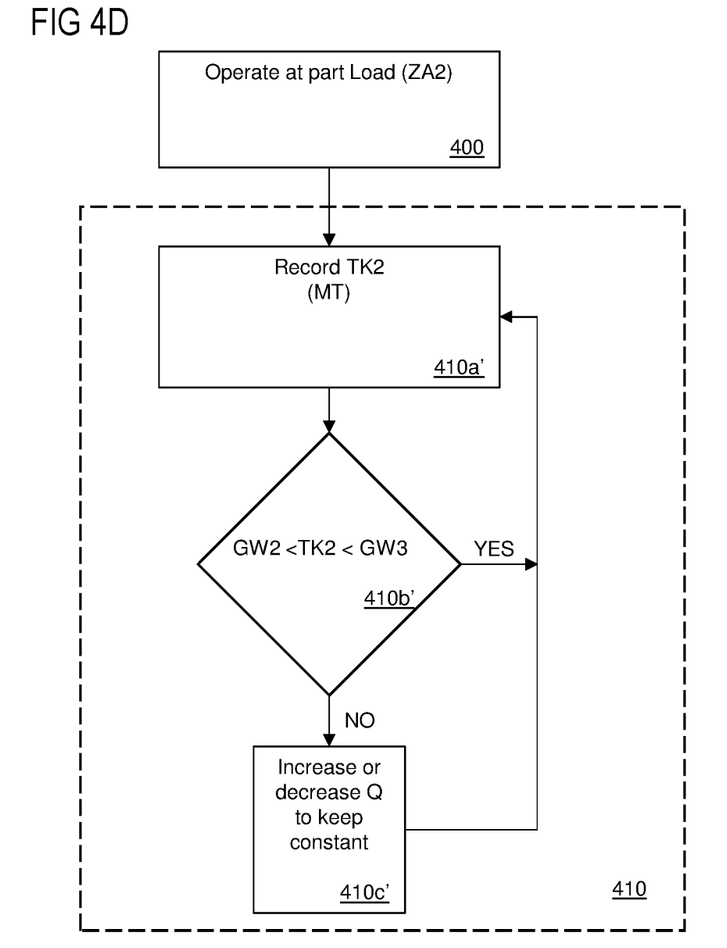

FIG. 4D illustrates further details for the further method [Steps 400-410] for operating the gas turbine (100) at partial load where the method is carried out with a partial load reduction [Step 400] until a second thermal characteristic (TK2) [Step 410a'], in this example a material temperature (MT) of the combustion chamber (4) as the second thermal characteristic (TK2), reaches a predetermined second limit value (GW2) [Step 410b']. In the next step [Step 410c'] the opening cross section (Q) of the bypass flow channel (10) is adjusted in such a way that the variation rate of the opening cross section (Q) is selected in such a way that the material temperature (MT) of the combustion chamber (4) is essentially constant, in particular that the material temperature (MT) of the combustion chamber (4) does not vary by more than 10%.

Figure 5:
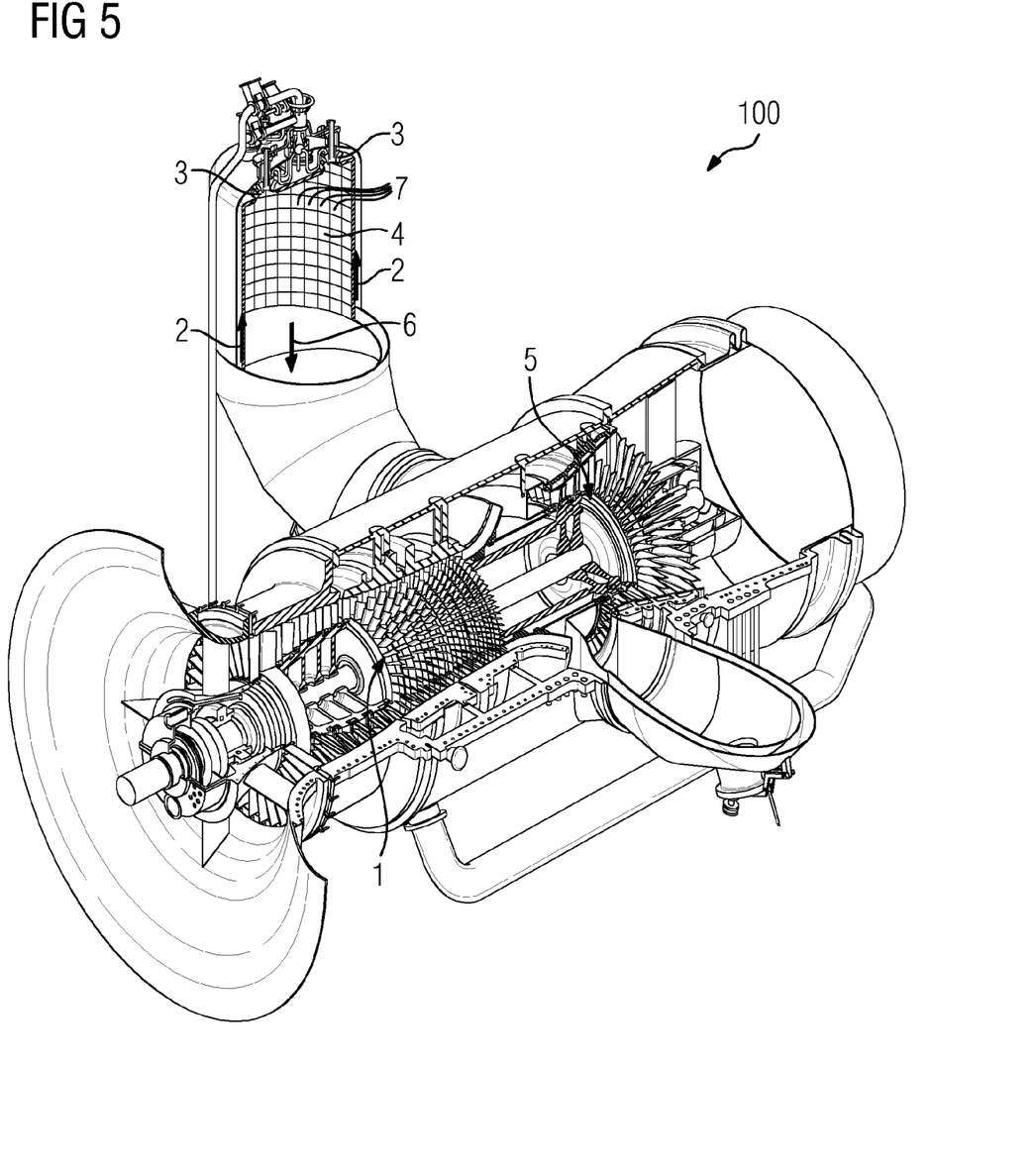
FIG. 5 shows an embodiment of a gas turbine according to the invention in perspective lateral sectional view.

FIG. 5 shows a perspective partial sectional view through a gas turbine 100 according to the invention, which essentially corresponds to the model SGT5-2000E sold by the Applicant. Besides a compressor 1 and an expansion turbine 5, the gas turbine 100 in this case comprises a combustion chamber 4 provided with a plurality of burners 3. During operation of the gas turbine 100, compressor air 2 is delivered laterally from the compressor 1 on the outside of the combustion chamber 4 to the burners 3. Because of the static pressure difference between the combustion chamber 4 and the pressure of the compressor air 2 fed to the outside of the combustion chamber 4, cooling air taken from this compressor air 2 flows through cooling channels 7 into the combustion chamber 4. The rest of the compressor air 2 is then fed to the burners 3 and burnt with a suitable fuel. The combustion products are discharged from the combustion chamber 4 as a hot gas flow 6 and fed to the expansion turbine 5 to perform mechanical work.

The gas turbine 100 represented has a bypass flow channel 10 (not further shown in detail), which is configured in order, during operation of the gas turbine 100, to deliver compressor air 2 past the burner 3 and to a hot gas flow 6 generated in the combustion chamber 4, in which case the opening cross section Q of the bypass flow channel 10 can furthermore be adjusted by a setting means 11. This setting means 11 is also not shown in detail here.

Figure 6:
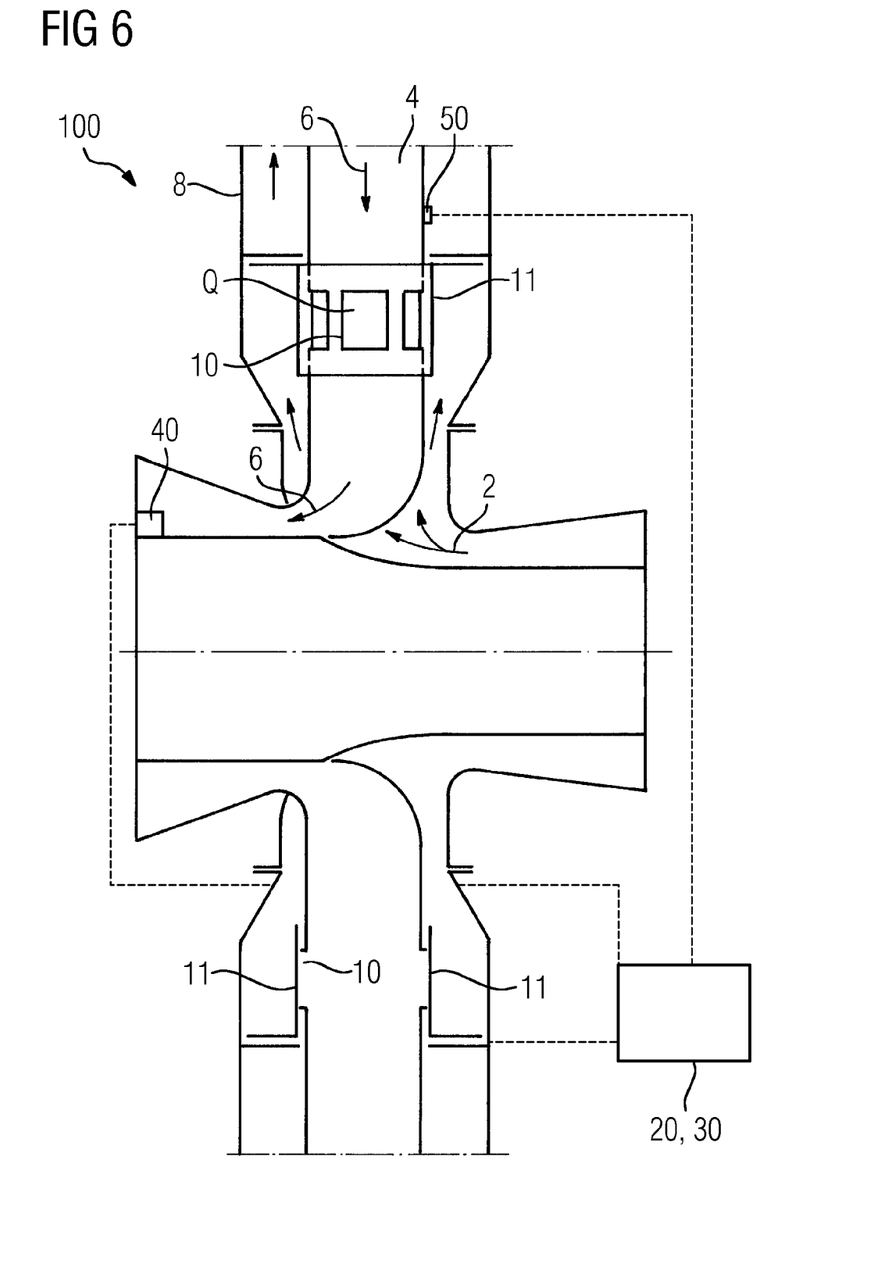
FIG. 6 shows a simplified schematic partial sectional view of the gas turbine shown in FIG. 5.

FIG. 6 shows a schematic side view through the embodiment of the gas turbine 100 as shown in FIG. 5, which represents both the bypass flow channel 10 and the setting means 11 for adjusting the opening cross section Q of the bypass flow channel 10. During operation of the gas turbine 100, compressor air 2 is initially delivered from a compressor 1 (not further shown) to the combustion chamber 4. The compressor air 2 is in this case fed to the burners 3 through a volume between the combustion chamber 4 and an outer wall 8. In this case, the compressor air 2 flows past the bypass flow channel 10, which has an opening cross section Q and fluidically connects the region between the combustion chamber 4 and the outer wall 8 to the combustion chamber 4 itself. The opening cross section Q can be adjusted by a slider configured as a setting means 11 (more detailed remarks about this technology may be found in DE 43 39 724 C1). The flow of the compressor air 2 is consequently divided at the opening cross section Q, one part flowing further to the burners 3 of the combustion chamber 4, but another part flowing through the opening cross section Q into the combustion chamber 4 for pressure equalization.

The flow of compressor air 2 fed to the burners 3 is furthermore reduced in that a part of this compressor air 2 can flow through cooling channels 7 (not further shown) into the combustion chamber 4 and in this case cool hot gas components (not further shown), in particular flame tube bottoms, of the combustion chamber 4. The cooling power is in this case proportional to the static pressure difference existing at the cooling channels.

The gas turbine 100 furthermore has an adjustment unit 20, which comprises a regulating circuit 30 that is configured for suitable adjustment of the opening cross section Q of the bypass flow channel 10. The gas turbine 100 likewise has a measurement probe 40, which records a thermal characteristic (for example the turbine output temperature) and communicates the measurement value to the adjustment unit 20, or the regulating circuit 30. The gas turbine 100 likewise has a second measurement probe 50 arranged in the combustion chamber 4, which is configured in order to metrologically record the material temperature MT of the combustion chamber 4 and to communicate the measurement value to the adjustment unit 20, or the regulating circuit 30. The adjustment unit 20 ensures that the opening cross section Q of the bypass flow channel 10 is adjusted in such a way that the variation rate V of the opening cross section Q is selected so that the primary zone temperature TPZ is essentially constant, and in particular does not vary by more than 10%, or that the variation rate V of the opening cross section Q is selected so that the relative combustion chamber pressure loss ABDV of the material temperature MT of the combustion chamber 4 is essentially constant, in particular so that the material temperature MT of the combustion chamber 4 does not vary by more than 10%.

Further embodiments may be found in the dependent claims.

The invention claimed is:

1. A method for operating, at partial load, a gas turbine which comprises
   a compressor for providing compressor air,
   a combustion chamber comprising a burner,
   cooling channels to cool hot gas parts in the combustion chamber,
   an expansion turbine,
   a bypass flow channel, which is configured to variably bypass the burner and the cooling channels to deliver compressor air into a hot gas now generated in the combustion chamber during gas turbine operation,
   wherein an opening cross section of the bypass flow channel is adjustable to change an amount of compressor air flowing past the burner and the cooling channels into the hot gas flow generated in the combustion chamber, thus affecting a cooling power to cool the hot gas parts in the combustion chamber, and
   wherein the partial load comprises a power range below a guide vane adjustment range in which primary zone temperature (TPZ) is managed, hereinafter referred to as TPZ power range, and a power range below the TPZ power range in which a thermal characteristic (TK2) is managed, hereinafter referred to as TK2 power range, the method comprising:
   operating the gas turbine at partial load in the TK2 power range during a time period (ZA2) by:
     (a) recording the thermal characteristic (TK2) comprising a relative combustion chamber pressure loss ($\Delta$BDV) or a material temperature (MT) of the combustion chamber; and
     (b) automatically adjusting the opening cross section of the bypass flow channel so that a variation rate of the opening cross section keeps the thermal characteristic (TK2) from varying by more than 10% out of a range between predetermined lower and upper limit values (GW2, GW3) by reducing and increasing the opening cross section, thereby resulting in an essentially constant cooling power in the combustion chamber,
   wherein the relative combustion chamber pressure loss ($\Delta$BDV) is a ratio of a combustion chamber differential pressure and a compressor final pressure, and wherein the combustion chamber differential pressure is a difference between a pressure, before or in a region of the burner and a downstream pressure inside the combustion chamber.

2. The method as claimed in claim 1, further comprising: operating the gas turbine at partial load in the TPZ power range during an initial time period (ZA1) prior to the time period (ZA2) by:
   adjusting the opening cross section of the bypass flow channel by increasing the opening cross section and thereby decreasing the cooling power in the combustion chamber, wherein the variation rate of the opening cross section is selected in such a way that the primary zone temperature (TPZ) is kept from varying more than 10%, and
   wherein the initial time period (ZA1) lasts until thermal loads for the hot gas parts of the combustion chamber reach a point of expected material damage and/or failure of individual components of the hot gas parts.

3. The method as claimed in claim 2, wherein the time period (ZA2) directly follows the initial time period (ZA1).

4. The method as claimed in claim 1, wherein, when the thermal characteristic (TK2) comprises the relative combustion chamber pressure loss ($\Delta$BDV), the method is carried out with a partial load reduction until the thermal characteristic (TK2) reaches the predetermined lower limit value (GW2), then the vas variation rate of the opening cross section being selected such that the opening cross section is reduced resulting in an increase in the cooling power.

5. The method as claimed in claim 4, wherein when the upper predetermined limit value (GW3) is reached by the thermal characteristic (TK2), the variation rate of the opening cross section is selected in such a way that the opening cross section is increased resulting in a decrease in the cooling power.

6. The method as claimed in claim 1, wherein the opening cross section of the bypass flow channel is adjustable by an adjustable slider.

7. The method as claimed in claim 1, wherein the material temperature (MT) of the combustion chamber is recorded directly or indirectly as a temperature of a wall of the combustion chamber, a temperature of tiles of the combustion chamber, or a temperature of a flame tube component of the combustion chamber.

8. A gas turbine, comprising:

a compressor for providing compressor air, a combustion chamber comprising, a burner, cooling channels to cool hot gas parts in the combustion chamber, an expansion turbine, a bypass flow channel, which is configured in order to variably bypass the burner and the cooling channels to deliver compressor air into a hot gas flow generated in the combustion chamber during gas turbine operation during partial load operation, wherein the partial load comprises a power range below a guide vane adjustment range in which primary zone temperature (TPZ) is managed, hereinafter referred to as TPZ power range, and a power range below the TPZ power range in which a thermal characteristic (TK2) is managed, hereinafter referred to as TK2 power range, wherein an opening cross section of the bypass flow channel is adjustable to change an amount of compressor air flowing, past the burner and the cooling channels into the hot gas flow generated in the combustion chamber, thus affecting a cooling power to cool the hot gas parts in the combustion chamber, and a control unit, which is configured during operation of the gas turbine in the TK2 power range to:
(a) receive the thermal characteristic (TK2) which comprises a relative combustion chamber pressure loss (ΔBDV) or a material temperature (MT) of the combustion chamber, and
(b) automatically adjust the opening cross section of the bypass flow channel during part load operation in the TK2 power range such that a variation rate of the opening cross section keeps the thermal characteristic (TK2) from varying by more than 10% out of a range between predetermined lower and upper limit values (GW2, GW3) by reducing and increasing the opening cross section, thereby resulting in an essentially constant cooling power in the combustion chamber, wherein the relative combustion chamber pressure loss (ΔBDV) is a ratio of a combustion chamber differential pressure and a compressor final pressure, and wherein the combustion chamber differential pressure is a difference between a pressure before or in a region of the burner and a downstream pressure inside the combustion chamber.

9. The gas turbine as claimed in claim 8, further comprising:

a regulating circuit and a measurement probe, the measurement probe being configured to record the thermal characteristic (TK2), wherein, when the thermal characteristic (1K2) comprises the relative combustion chamber pressure loss (ΔBDV), the regulating circuit being configured to, in the event of a partial load reduction and when the predetermined lower limit value (GW2) of the thermal characteristic (TK2) comprising the relative combustion chamber pressure, loss is reached, select the variation rate of the opening cross section in such a way that the opening cross section is reduced resulting in an increase in the cooling power.

10. The gas turbine as claimed in claim 8, wherein the gas turbine is configured such that when the compressor air is delivered to the burner, the compressor air is also provided at least partially in order to cool the hot gas parts of the combustion chamber by feeding through the cooling channels in the combustion chamber.

11. The gas turbine as claimed in claim 10, wherein the hot gas parts of the combustion chamber comprise flame tube bottoms.

12. The gas turbine as claimed in claim 8, wherein the opening cross section of the bypass flow channel is adjustable by an adjustable slider.

* * * * *